(12) United States Patent
Crowley et al.

(10) Patent No.: US 9,103,486 B2
(45) Date of Patent: Aug. 11, 2015

(54) LOCKING SWIVEL SUPPORT APPARATUS

(71) Applicant: QUICK-SLING, LLC, Taunton, MA (US)

(72) Inventors: William J. Crowley, East Freetown, MA (US); Kyle R. Johnson, Easton, MA (US)

(73) Assignee: QUICK-SLING, LLC, Taunton, MA (US)

( * ) Notice: Subject to any disclaimer, the term of this patent is extended or adjusted under 35 U.S.C. 154(b) by 173 days.

(21) Appl. No.: 13/796,927

(22) Filed: Mar. 12, 2013

(65) Prior Publication Data

US 2013/0284880 A1    Oct. 31, 2013

Related U.S. Application Data

(60) Provisional application No. 61/610,331, filed on Mar. 13, 2012.

(51) Int. Cl.
*F24F 13/32* (2006.01)
*F16M 13/02* (2006.01)
*F16M 11/32* (2006.01)

(52) U.S. Cl.
CPC .............. *F16M 13/02* (2013.01); *F16M 11/32* (2013.01); *F16M 13/027* (2013.01); *F24F 13/32* (2013.01)

(58) Field of Classification Search
CPC ........................................................ F24F 13/32
USPC .................. 248/644, 670, 317, 323, 324, 326
See application file for complete search history.

(56) References Cited

U.S. PATENT DOCUMENTS

| | | | | |
|---|---|---|---|---|
| 2,889,128 | A * | 6/1959 | Martin et al. ................ | 248/324 |
| 5,407,171 | A * | 4/1995 | Gonzalez ..................... | 248/670 |
| 7,793,908 | B1 * | 9/2010 | Finegan, Jr. ................ | 248/317 |
| 8,348,071 | B1 * | 1/2013 | Janlert ........................ | 211/175 |
| 8,701,261 | B2 * | 4/2014 | Crowley ..................... | 29/434 |
| 8,827,232 | B2 * | 9/2014 | Crowley ..................... | 248/670 |
| 2007/0119805 | A1 * | 5/2007 | Nawrocki ................... | 211/119 |
| 2012/0181240 | A1 | 7/2012 | Crowley | |

* cited by examiner

*Primary Examiner* — Bradley Duckworth
(74) *Attorney, Agent, or Firm* — McLane, Graf, Raulerson & Middleton, Professional Association

(57) ABSTRACT

An improved hanging apparatus with a locking swivel for suspending objects from an overhead structure is provided. The apparatus may advantageously be employed to suspend a heating, ventilation, and air conditioning ("HVAC") unit from a ceiling, ceiling joists, beams, trusses, rafters, or the like of a room or space to be heated or cooled by the HVAC unit.

20 Claims, 22 Drawing Sheets

LOCKING SWIVEL SUPPORT APPARATUS

CROSS-REFERENCE TO RELATED APPLICATION

This application claims the priority benefit of U.S. Provisional Application Ser. No. 61/610,331 filed Mar. 13, 2012. The aforementioned provisional application is incorporated by reference in its entirety.

INCORPORATION BY REFERENCE

This application is related to U.S. application Ser. No. 13/006,316 filed Jan. 13, 2011 and U.S. application Ser. No. 13/274,763 filed Oct. 17, 2011. Each of the aforementioned applications is incorporated herein by reference in its entirety.

BACKGROUND

The present disclosure relates to improved systems and methods for hanging or suspending an object from an overhead structure. The present development will be described primarily by way of reference to a hanging apparatus for suspending a heating, ventilation, and air conditioning ("HVAC") unit from a ceiling, ceiling joists, beams, trusses, rafters, or the like of a room or space to be heated or cooled by the HVAC unit, although it will be recognized that the apparatus herein could be adapted to hanging os suspending other objects. In certain embodiments, the system is adjustable to adjust the height at which the HVAC unit is suspended. In certain embodiments, a low profile hanger bar is employed, which may advantageously be employed in a finished space. In certain embodiments, the system is adjustable to accommodate HVAC units of different sizes.

The present system is advantageously employed with an HVAC device that is connected to a fuel source by a pipe or flexible hose. Although the HVAC devices will typically be powered by natural gas or propane, it will be recognized that the present hanging system may be uses with all manner of heating and cooling units, including without limited to HVAC models that are powered by home heating oil, waste oil, diesel fuel, steam, hot water, and electricity.

Commonly, suspended HVAC units are installed based on the orientation of the ceiling joists, beams, trusses, or rafters. Therefore, the direction of the heat or cold air is controlled only at the point of installation. Often, HVAC units are installed in a corner of a room and are only able to blow air straight ahead down the aligning wall, thereby reducing the heating or cooling efficiency of the HVAC unit. The present hanging system includes a locking swivel that allows the unit to be rotated in any desired direction. In this manner, the HVAC unit can readily be oriented to blow air out into the center of the room or area to be heated or cooled, thereby increasing the heating or cooling effectiveness of the unit installed.

A traditional method of suspending an HVAC unit, illustrated in FIG. 27, employs the use of strut channels (e.g., UNISTRUT or the like) attached to the ceiling joists (or boards attached to or between the joists, as may be necessary to achieve a desired angular position of the HVAC unit) and threaded rods supporting the HVAC unit at its corners. When a non-swivel installation is completed, however, the HVAC unit is in a fixed position and cannot be adjusted unless it is reinstalled. This limitation can create extreme difficulty for the installer in that he may have to spend an inordinate amount of time calculating an acceptable path to best bring the fuel pipe, electrical and venting connections to this fixed position.

In contrast, the present locking swivel system of this disclosure can be rotated to assist the installer with finding an optimal position for venting, fuel, and electrical connections.

In addition to this flexibility during the installation phase for both the installer and the consumer (which does not exist for the prior art strut channel/threaded rod method), the present locking swivel system in accordance with this disclosure also provides additional advantages should the installed HVAC unit require routine maintenance or service down the road. For example, HVAC units typically have one or more removable access panels or doors that provide access to the interior of the unit for servicing or repair. In the prior art strut channel/threaded rod fixed installations, if an access panel is in an inconvenient location, such as adjacent to a wall or other obstacle, future servicing and repair of the HVAC unit can be made more difficult or time consuming. In the present system, however, the bolts on the locking swivel can be removed (and the fuel line shut off and disconnected, if applicable) to permit the HVAC unit to be rotated to a desired position that allows for easier and more effective access to the unit for the service required. In this manner, the installer is provided with the full range of installation options without compromising the future serviceability of the unit. Once the servicing or maintenance is completed, the HVAC unit can be rotated back to the desired position for operation and locked back into a fixed position once again.

Although the present locking system will be described herein by way of reference to the preferred application of suspending an HVAC unit in a room, garage, basement, workshop, barn, warehouse, greenhouse, or other space to be heated or cooled, whether residential, commercial, or industrial, it will be recognized that the present system may be adapted to attach to all manner of overhead joists, beams, rafters, trusses, and other supports, whether of wood or metal (e.g., steel) construction.

In addition to hanging air conditioning and heating units, the present locking system can readily be adapted to suspend virtually any type of equipment or items, including without limitation hay, tires, or equipment in a barn or large garage setting. In addition, the locking system may be made any size as dictated by the object to be suspended. For example, the size of the locking wheel system herein may be increased to allow it to be used for larger heating elements or larger objects.

SUMMARY

In one aspect, an apparatus comprises an upper hanging member having at least one arm adapted to be attached at an upper end to an overhead structure and a horizontal portion attached to the at least one arm. A lower hanging member is adapted to attach to an object to be suspended from the overhead structure. An upper locking disk comprises a first planar body and a first pair of opposing walls projecting upward from the first planar body defining a first channel. The horizontal portion of the upper hanging member is received within the first channel. A lower locking disk comprises a second planar body and a second pair of opposing walls projecting downward from the second planar body defining a second channel. The lower hanging member is received within the second channel. A fastener extends through aligned bores in the horizontal portion of the upper hanging member, the first channel, the second channel, and the lower hanging member to provide a pivoting connection between the upper hanging member and the lower hanging member. A first plurality of spaced apart apertures is formed in the first planar body and arranged in a full or partial circular array. A second plurality of spaced apart apertures formed in the second planar body and arranged in a full or partial circular array. One or more fasteners are removably received in a selected one of the first plurality of spaced apart apertures and a selected, aligned one of the second plurality of spaced apart apertures for affixing the lower hanging member in a desired angular orientation relative to the upper hanging member.

In another aspect, a kit having component parts capable of being arranged in a disassembled or partially disassembled form and of being assembled into a hanging swivel support apparatus is provided. The kit comprises an upper hanging member having at least one arm adapted to be attached at an upper end to an overhead structure and a horizontal portion attached to the at least one arm, and a lower hanging member adapted to attach to an object to be suspended from the overhead structure. An upper locking disk comprises a first planar body and a first pair of opposing walls projecting upward from the first planar body and defining a first channel. The horizontal portion of the upper hanging member is sized to be received within the first channel. A lower locking disk comprises a second planar body and a second pair of opposing walls projecting downward from the second planar body and defining a second channel, the lower hanging member being sized to be received within the second channel. A fastener is configure to extend through aligned bores in the horizontal portion of the upper hanging member, the first channel, the second channel, and the lower hanging member to provide a pivoting connection between the upper hanging member and the lower hanging member when the hanging swivel support apparatus is assembled. A first plurality of spaced apart apertures are formed in the first planar body and arranged in a full or partial circular array and a second plurality of spaced apart apertures are formed in the second planar body and arranged in a full or partial circular array. One or more fasteners are adapted to be removably received in a selected one of the first plurality of spaced apart apertures and a selected, aligned one of the second plurality of spaced apart apertures for affixing the lower hanging member in a desired angular orientation relative to the upper hanging member when the hanging swivel support apparatus is assembled.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
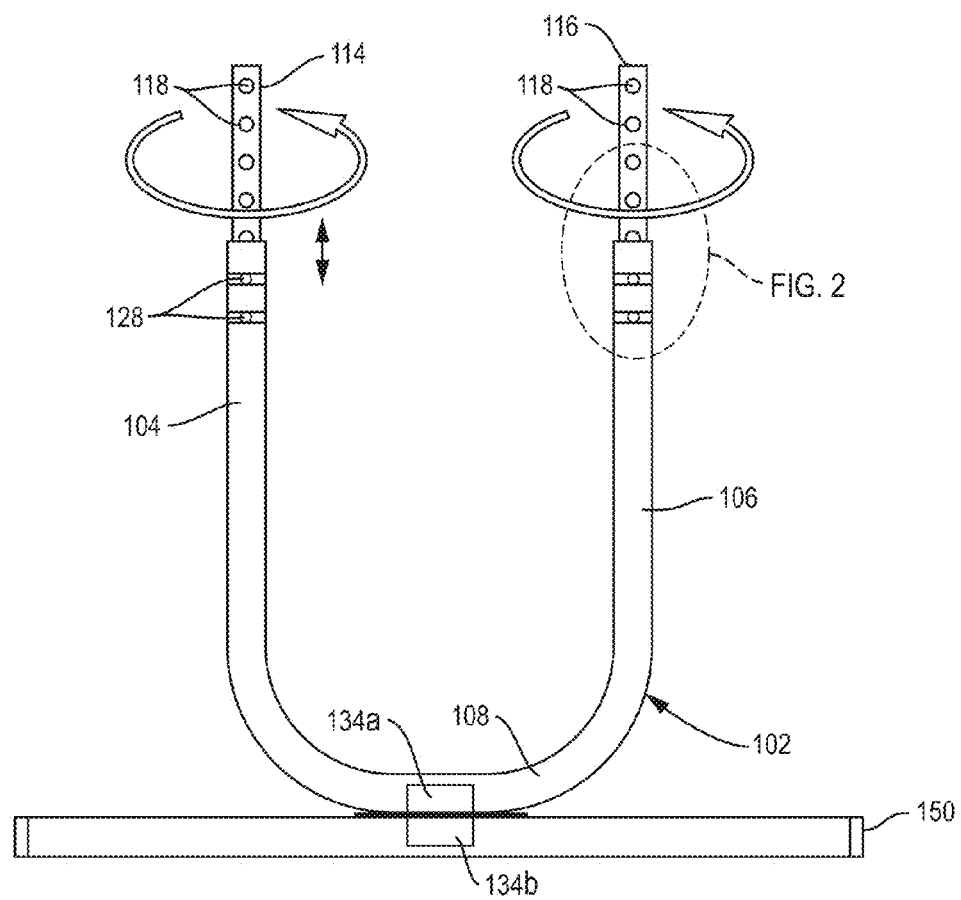
FIG. 1 is a front elevational view of a first embodiment of the locking swivel hanger herein, wherein the hanger bars and the U-bar are in the fully retracted position.
Figure 2:
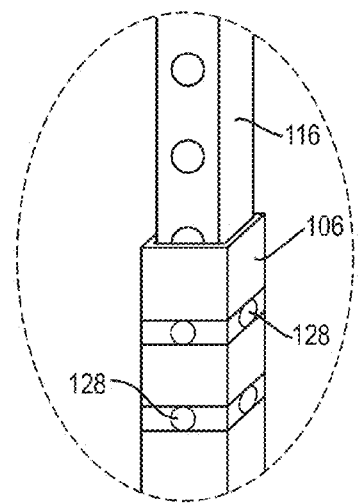
FIG. 2 is an enlarged perspective view of the region 2 appearing in FIG. 1.

Referring now to the drawings, wherein like reference numerals denote like or analogous components throughout the several views, FIGS. 1-5 illustrate a first embodiment locking swivel hanger unit 100, which includes a generally U-shaped U-bar 102 having left and right vertically-extending (in the orientation shown in FIG. 1) portions 104 and 106, respectively, and a generally horizontal (in the orientation shown in FIG. 1) portion 108 extending therebetween. The U-bar 102 is composed of square metal (preferably steel) tubing having a generally rectangular and preferably generally square cross-sectional shape and which is precut to size and fabricated to shape.

Left and right hanger arms 114 and 116, respectively, are telescopically received within the vertical portions 104 and 106, respectively. The left and right hanger arms 114 and 116 are formed of square or rectangular tubing formed of steel or other metal having outer dimensions sized to be slidingly received within the vertical portions 104 and 106 of the U-bar 102. The hanger arms 114, 116 have openings, e.g., drilled or punched openings 118, spaced along their lengths, for example, located on centers which are between one and two inches for adjustability, although other spacings between the openings 118 are contemplated depending on the increment for adjustment. The vertical portions 104, 106 each have one or more (two in the illustrated preferred embodiment) openings 128 adapted to receive mechanical fasteners, such as screws, bolts, pins, clevis pins, etc. The hanger arms 114, 116 are telescopically adjusted relative to the vertical portions 104, 106 until the openings 128 align with desired ones of the openings 118 so as to provide for different height adjustments.

Figure 3:
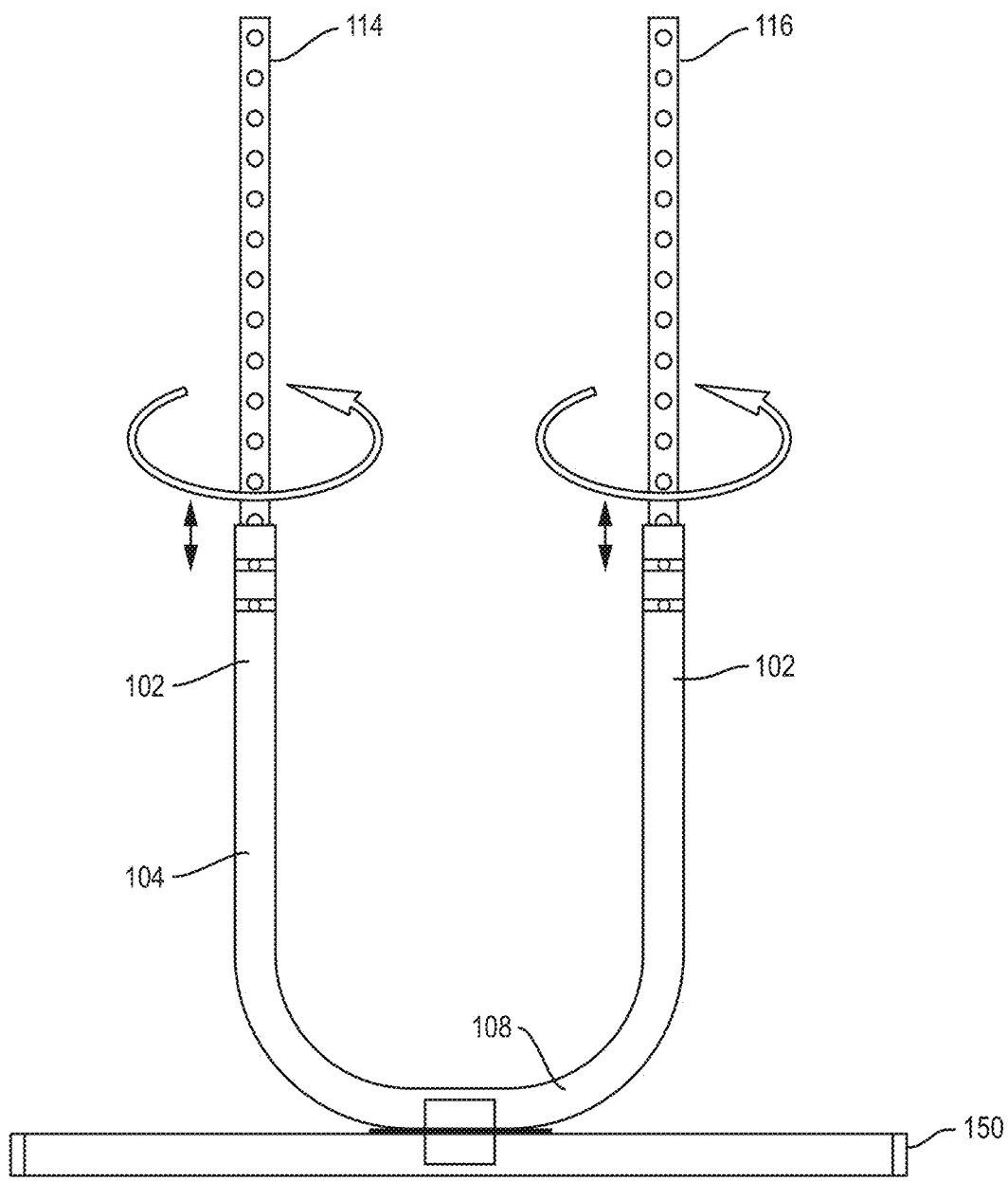
FIG. 3 is a front elevational view of the embodiment appearing in FIG. 1, wherein the hanger bars and the U-bar are in the fully extended position.
Figure 4:
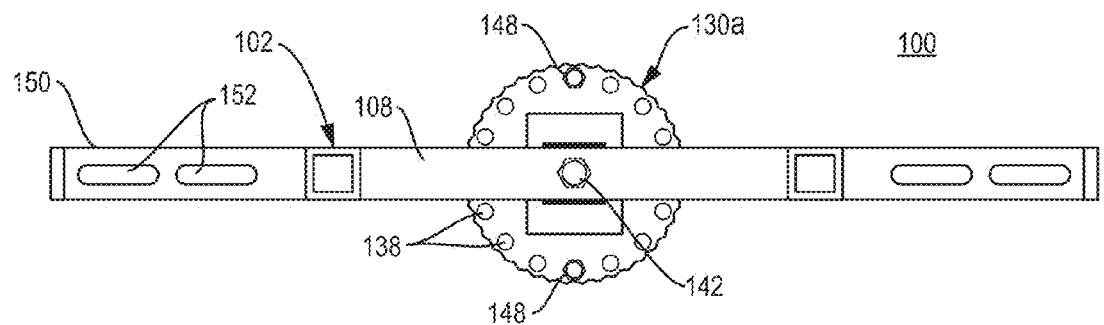
FIG. 4 is a top view of the embodiment appearing in FIG. 1 in the non-pivoted position.
Figure 5:
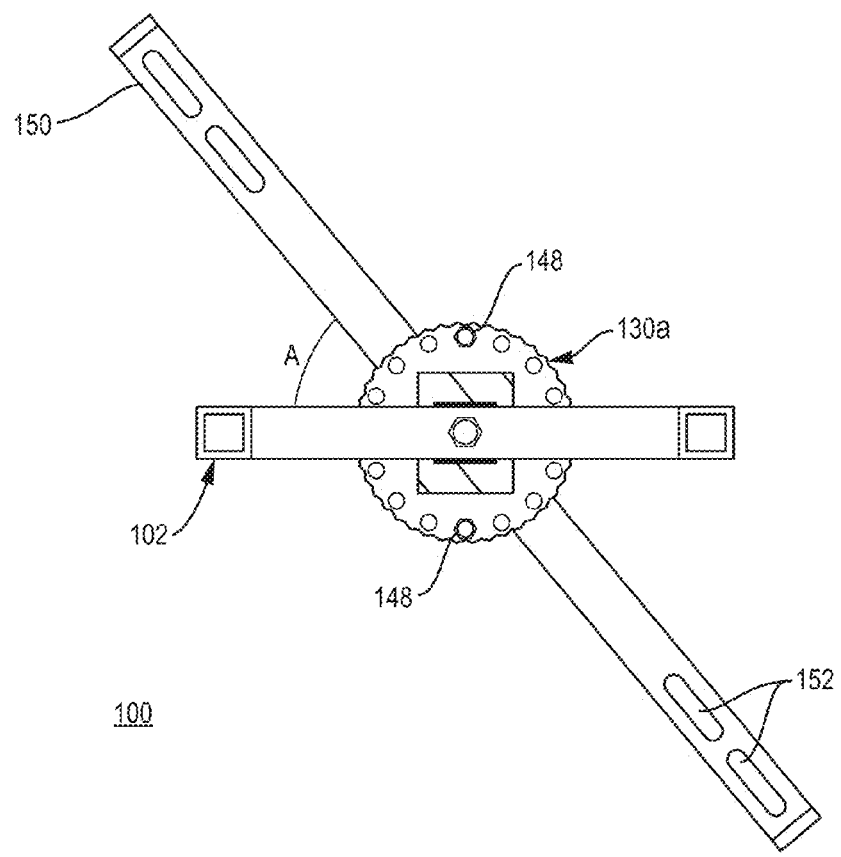
FIG. 5 is a top view of the embodiment appearing in FIG. 1 in a pivoted position.
Figure 6:
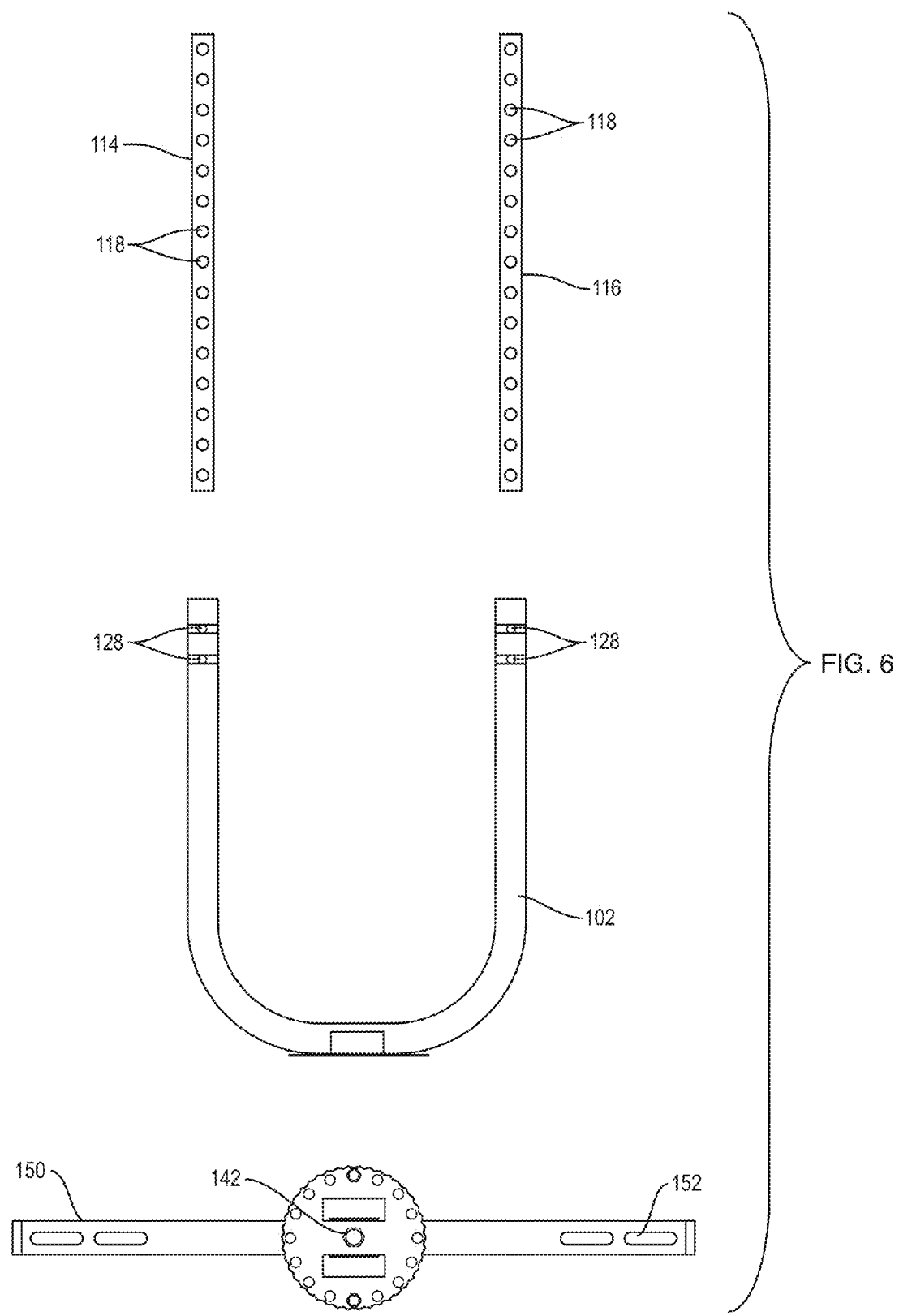
FIG. 6 is an assembly view of the embodiment appearing in FIG. 1, wherein the hanger bars are shown in elevation view and wherein the swivel bar with the lower locking disk are shown in top plan view for ease of exposition.

FIG. 1 shows the hanger arms 114 and 116 in the fully retracted position and FIG. 3 shows the hanger arms 114 and 116 in the fully extended position. In a preferred embodiment, the height of the U-bar and hanger arms may range from approximately 19.5 inches in the fully retracted position to about 27.5 inches in the fully extended position, although it will be recognized that the unit could be adapted for any desired height range.

Although only the front surfaces of the hanger arms and the vertical portions appear in FIG. 1, the rearward facing surfaces will likewise have the spaced apart openings 118 and the one or more openings 128. In preferred embodiments, either or both of the vertical portions and the hanger arms will also have spaced openings on the left and right facing surfaces. In an especially preferred embodiment, the hanger arms and the U-bar are formed of square tubing, wherein the vertical portions 104 and 106 each have openings 128 on the front and rear surfaces as well as the left and right surfaces. In this manner, it is only necessary for the hanger arms to have openings 118 on two parallel surfaces.

In the illustrated embodiment of FIG. 1, wherein the hanger arms are inserted into the respective vertical portions such that the openings 118 are oriented from front to rear as illustrated, the hanger arms may be secured to a single joist (not shown) via fasteners (e.g., screws, bolts or other threaded or mechanical fasteners) passing through the openings 118. Alternatively, the hanger arms can be removed from the vertical portions and rotated 90 degrees as indicated by the arrows, the hanger arms 114, 116 can be secured to parallel (e.g., adjacent) joists via fasteners passing through the openings 118. In further embodiments, the hanger arms 104 and 106 may have spaced apart openings on all four sides allowing installation either parallel or perpendicular to the joists without the need to remove and rotate the hanger arms 90 degrees.

A pair of locking plates, comprising an upper locking plate 130a and a lower locking plate 130b, is disposed between the transverse portion 108 and a transverse swivel bar 150. The locking plates 130a, 130b may be formed of a metal, e.g., steel, sheet or plate stock material. The swivel bar 150 may be made from the same tubular stock material as the U-bar 102.

Figure 7:
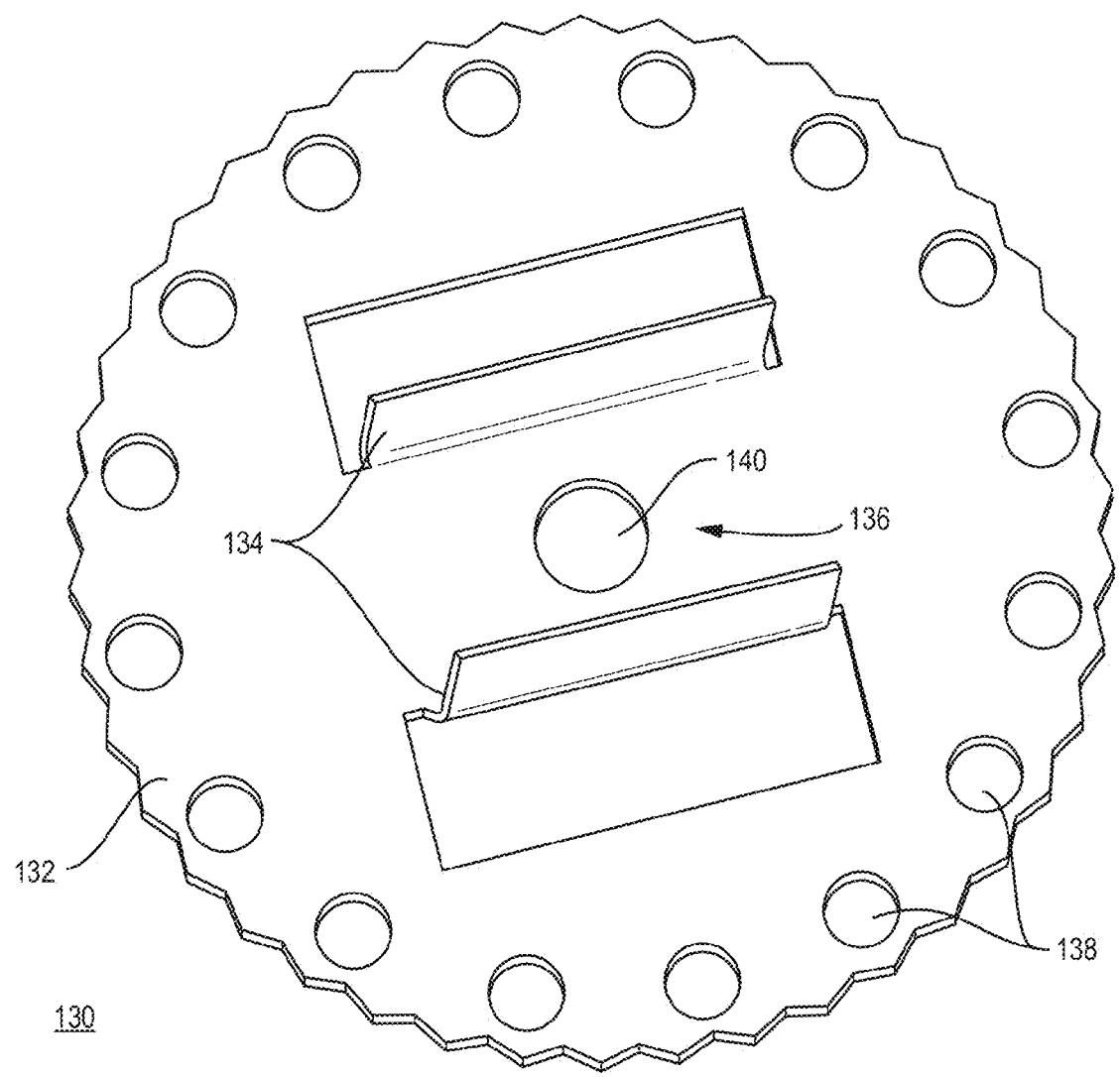
FIG. 7 is a photographic image of one of the locking wheels herein.

As best seen in FIG. 7, an enlarged view of an exemplary locking plate 130 is illustrated. The plate includes a disc portion 132 and a pair of upstanding and facing vertical walls 134 defining a channel 136 therebetween. The walls 134 may be fabricated from a single piece of sheet or plate material and bending. The channel 136 of the upper plate 130a is sized to removably receive the U-bar transverse portion 108 and the channel 136 of the lower plate 130b is sized to removably receive the swivel bar 150. In the illustrated embodiment, wherein the U-bar 102 and the swivel bar 150 are formed of the same type of tubular stock material, the upper and lower locking plates 130a and 130b may be of identical construction.

The plate 130 includes a plurality of opening 138 in a generally circular array. A central opening 140 is provided for receiving a pivot fastener 142 (see FIG. 8) such as pin, bolt, or the like.

Figure 8:
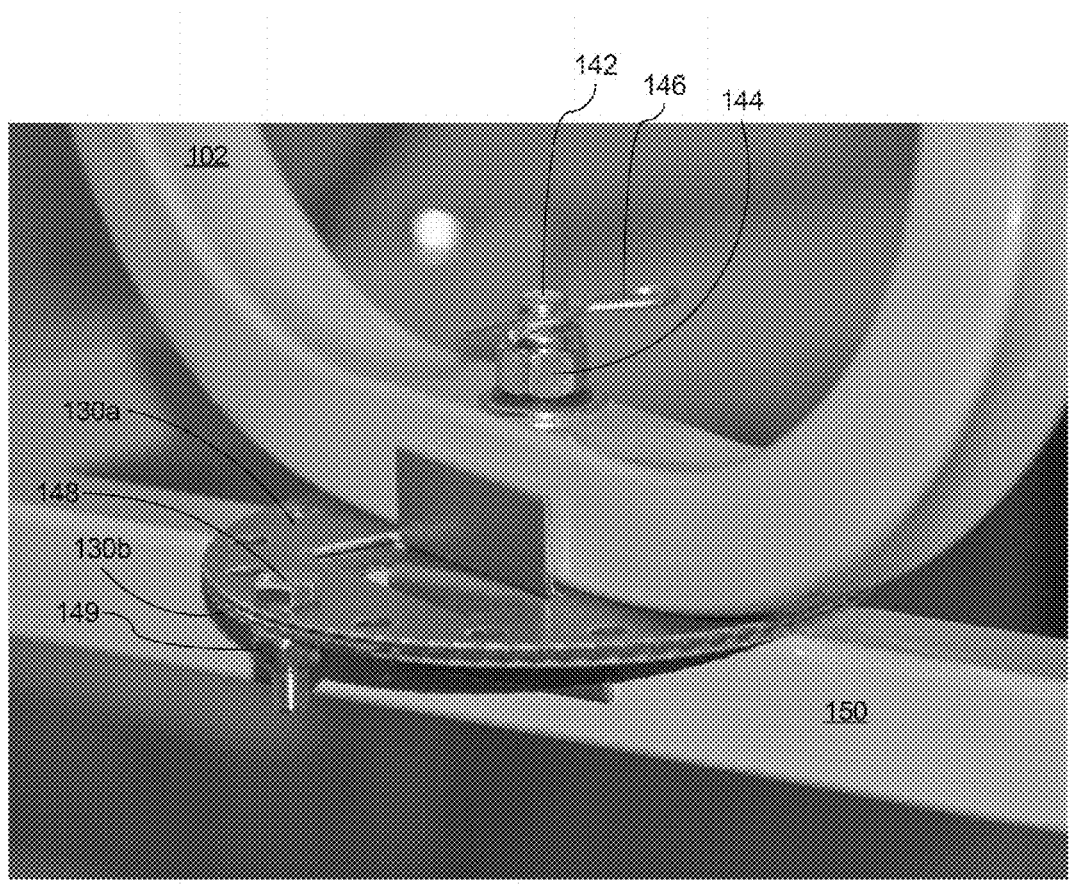
FIG. 8 is an enlarged view of the locking wheel assembly in a partially rotated and locked position.
Figure 9:
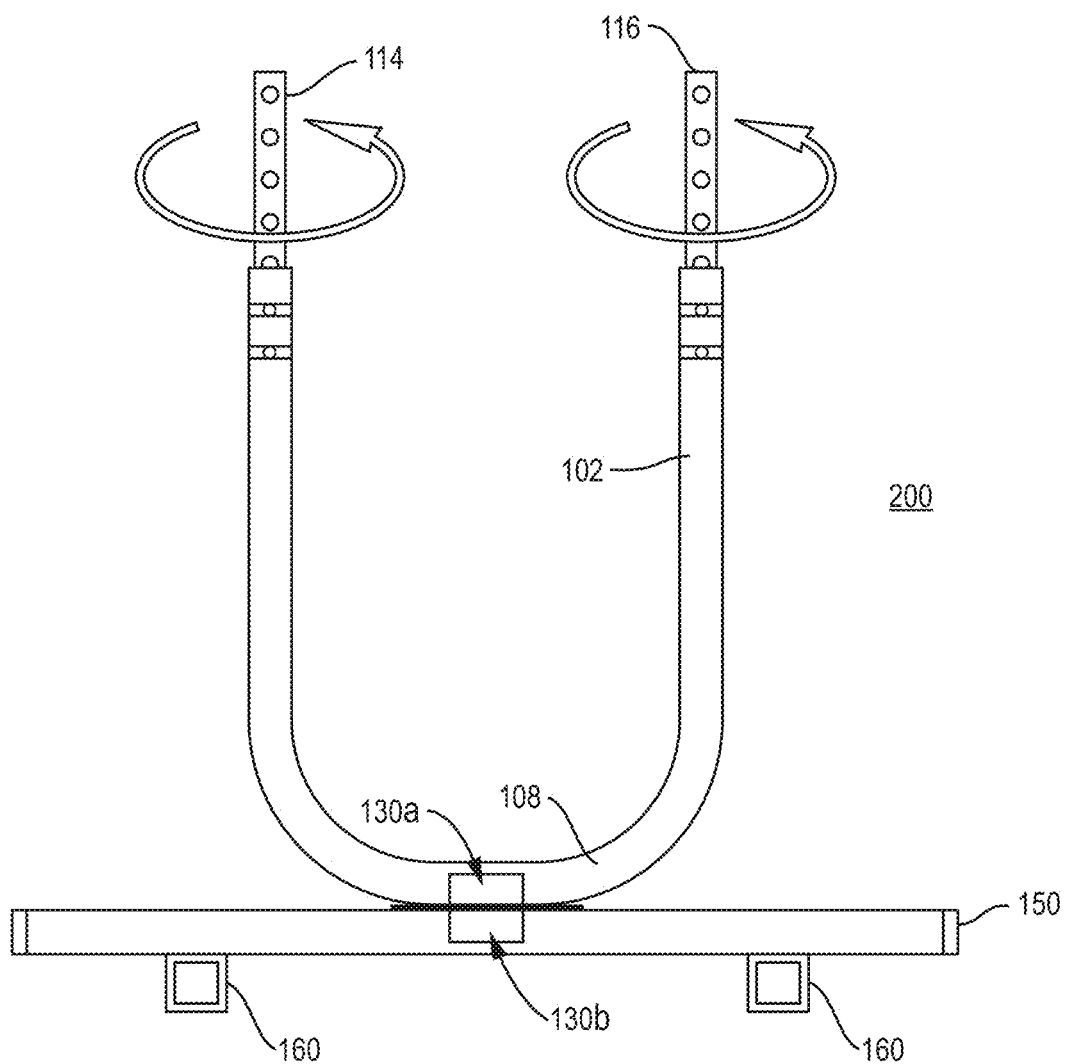
FIG. 9 is a front elevational view of a second embodiment of the locking swivel hanger herein, wherein the hanger bars and the U-bar are in the fully retracted position.
Figure 10:
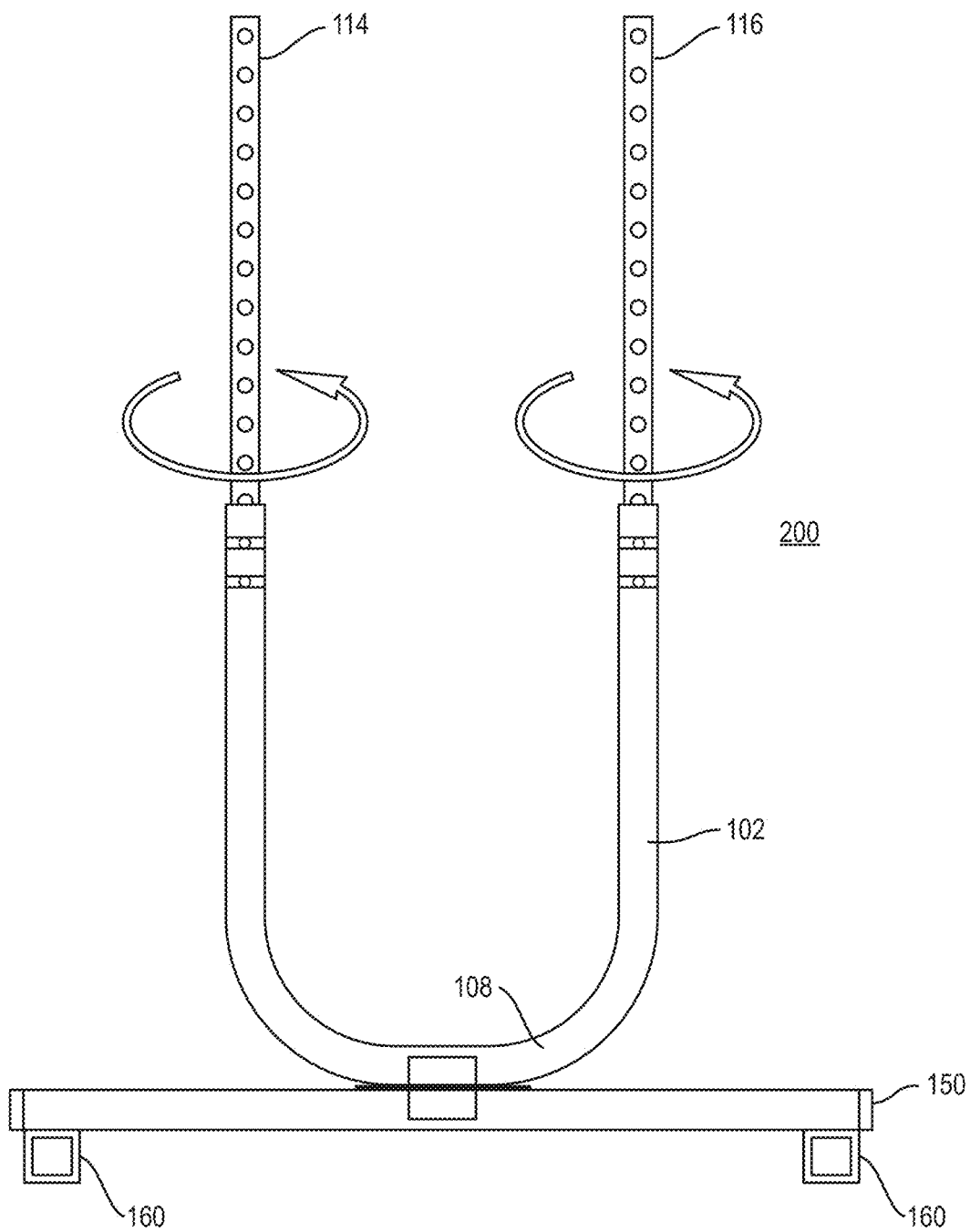
FIG. 10 is a front elevational view of the embodiment appearing in FIG. 9, wherein the hanger bars and the U-bar are in the fully extended position.

As best seen in FIG. 8, and with continued reference to FIGS. 1-7, the first plate 130a and second plate 130b are disposed back to back, with the transverse U-bar portion 108 being received within the channel 136 of the upper plate and the swivel bar 150 being received within the channel 136 of the lower plate. The pivot fastener 142 extends through the openings 140 in the plates 130a, 130b, as well as through aligned openings in the transverse portion 108 and the swivel bar 150. In this manner, the U-bar 102 and the upper plate 130a are rotatable relative to the swivel bar 150 and the lower plate 130b. In the illustrated embodiment, the pivot fastener 142 is a threaded bolt. In the depicted preferred embodiment, a threaded nut 144 is received on the threaded end of the bolt 142. In the preferred embodiment, a removable pin 146, which may be a cotter pin, R-clip, or the like, is received through a transverse bore in the end of the bolt 142 to prevent inadvertent removal of the nut 144. In operation, the swivel bar 150 may then be rotated to any desired angular position A (see FIG. 5) relative to the U-bar 102. Preferably, a sufficient number of openings are provided to allow locking the swivel bar 150 at selected increments throughout 360 degrees of rotation. When the swivel bar 150 has been rotated to the desired position, one or more (preferably two) fasteners 148 are passed through vertically aligned openings 138 on the upper and lower plates 130a, 130b to secure the U-bar and the swivel bar in the desired rotational position. In the depicted embodiment, the fastener is a threaded bolt 148 secured via a complimentary threaded nut 149, although other mechanical fasteners, such as pins, clamps and so forth are also contemplated.

In the depicted embodiment, the swivel bar 150 is illustrated as being formed of generally tubular stock having a generally square cross-sectional shape and having a plurality of openings 152 there for receiving fasteners used to secure an HVAC unit or other item or device to the swivel bar 150. In the depicted embodiment, the openings 152 are elongated to allow adjustability, as will be described in greater detail below. It will be recognized that the swivel bar 150 may be adapted for the particular units or items to be suspended.

Referring now to FIGS. 9-14, there appears a second embodiment locking swivel hanger 200 which adds H-bar bracket members 160 for suspending an HVAC unit or other item at four points, such as 4 points at or near the corners, but otherwise, the apparatus 200 is as described above by way of reference to the apparatus 100. Unless stated otherwise, reference numerals appearing in FIGS. 9-14 are as described above by way of reference to FIGS. 1-8, which discussion above is equally applicable and incorporated here by reference.

The unit 200 includes the U-bar 102, telescoping hanger arms 114 and 116, wherein the swivel bar 150 and the upper and lower locking plates 130a and 130b are pivotally secured to the U-bar transverse section 108 as detailed above. Again, the hanger arms 114 and 116 are telescoping to allow the HVAC or other item to be suspended at a user-adjustable height between the fully retracted position (see FIG. 9) and the fully extended position (see FIG. 10). In addition, the swivel bar 150 may be pivoted to any desired angle A (see FIG. 13) as described above.

Figure 11:
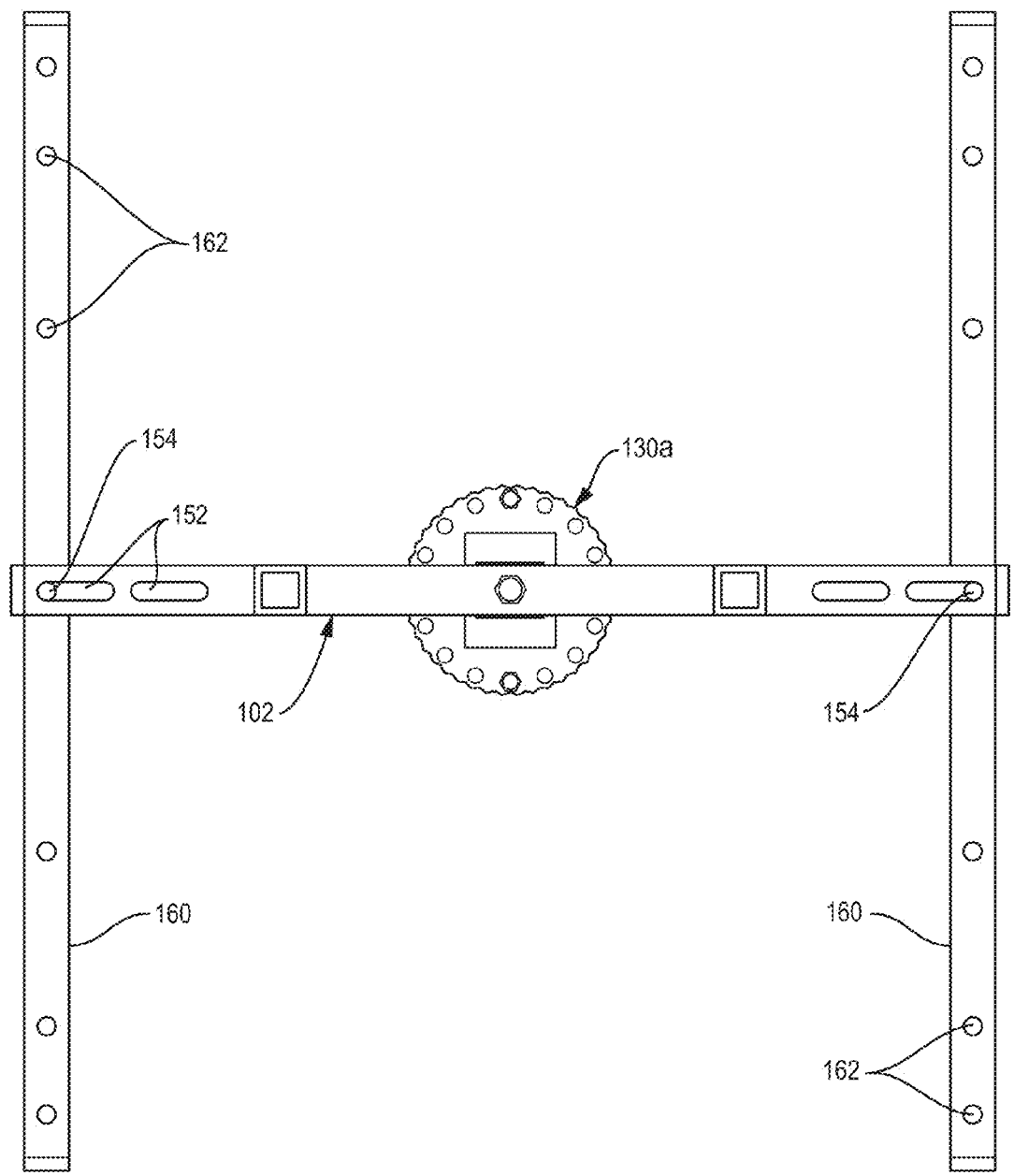
FIG. 11 is a top view of the embodiment appearing in FIG. 9 in the non-pivoted position, showing the swivel bar carrying the unit connector arms in the fully expanded position.
Figure 12:
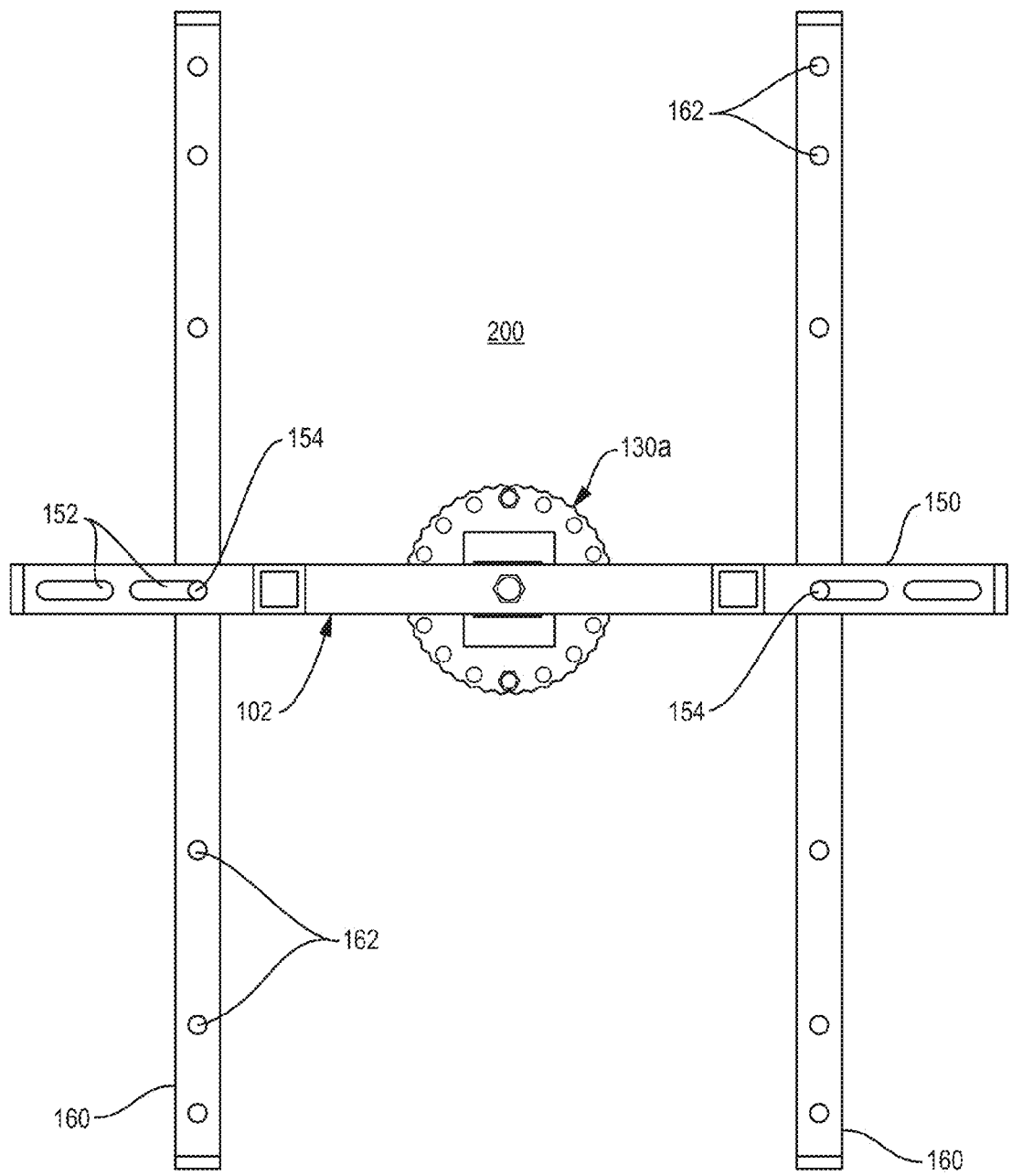
FIG. 12 is a top view of the embodiment appearing in FIG. 9 in the non-pivoted position, showing the swivel bar carrying the unit connector arms in the fully retracted position.
Figure 13:
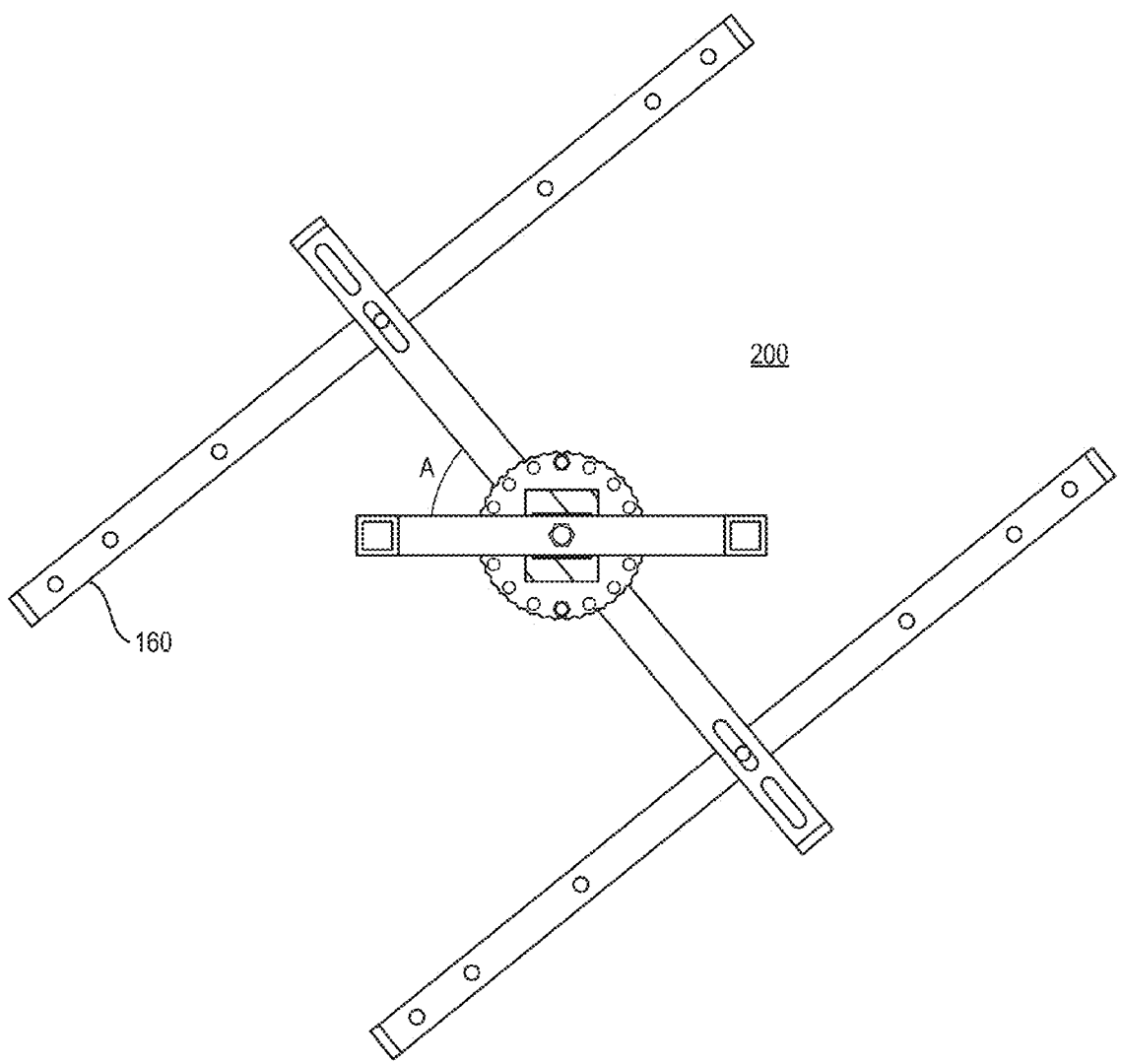
FIG. 13 is a top view of the embodiment appearing in FIG. 9 in a pivoted position, with the swivel bar carrying the unit connector arms in the fully retracted position.
Figure 14:
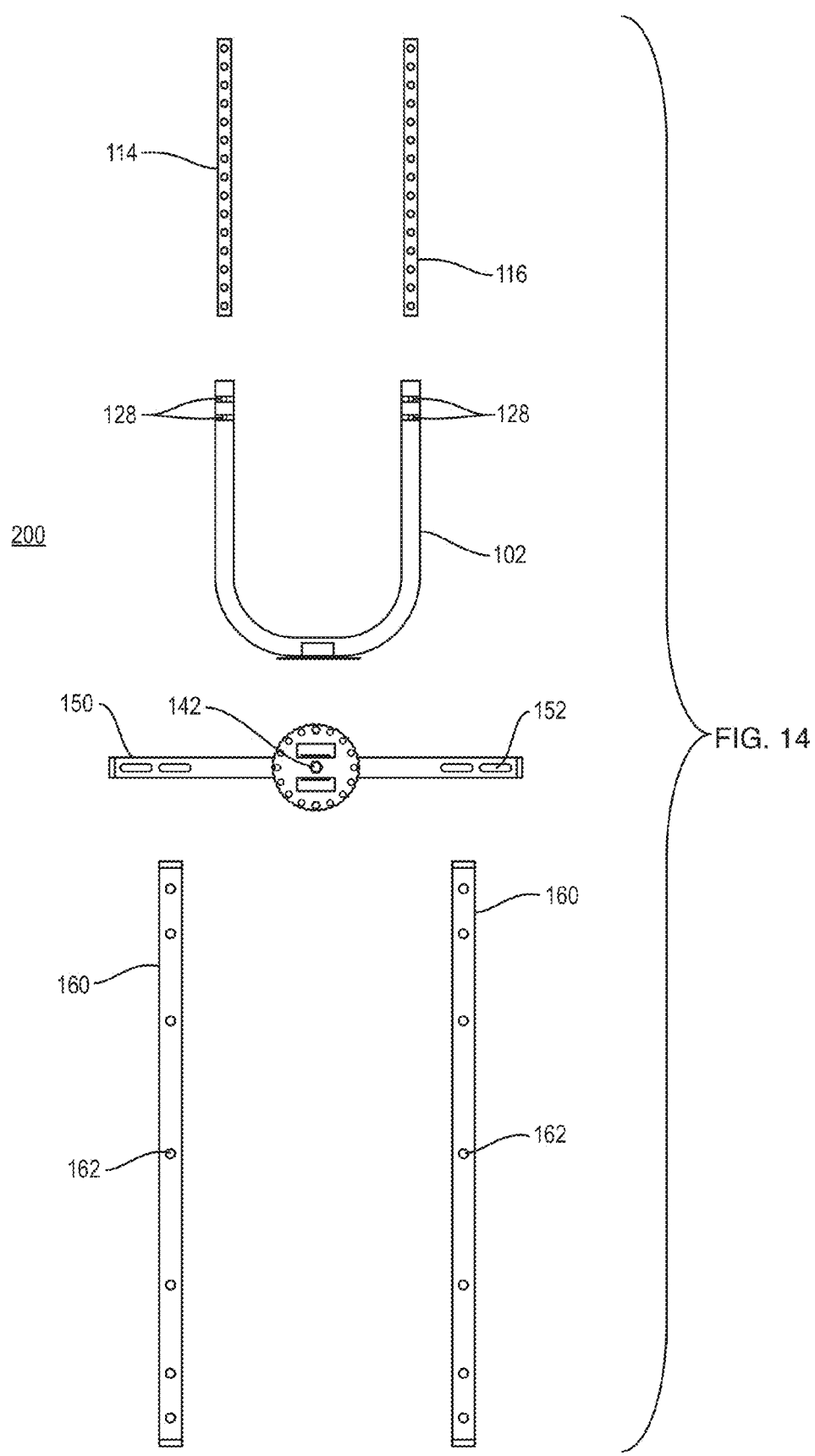
FIG. 14 is an assembly view of the embodiment appearing in FIG. 9, wherein the hanger bars are shown in elevation view, and wherein the swivel bar with the lower locking disk and the unit connector arms are shown in top plan view.

As best seen in FIGS. 11 and 12, the H-bars 160 are secured on opposite sides of the swivel bar 150 using a mechanical fastener (e.g., a threaded fastener) 154. The H-bars 160 may be formed of a metal (e.g., steel) tubular stock material and may be, for example, formed of the same stock material as the U-bar and/or the swivel bar. The H-bars 160 each preferably include a plurality of openings 162 along its length. The H-bars 160 are secured via the fasteners 154 passing through one of the openings 152 in the swivel bar 150 and one of the openings 162 in the H-bars 160, preferably a centrally located one of the openings 162. In the depiction of FIG. 11, the H-bars 160 are secured when the fasteners 154 pass through the outer ends of outermost elongate openings 152 in the swivel bar 150, thus illustrating the H-bar assembly in the fully extended position.

Figure 23:
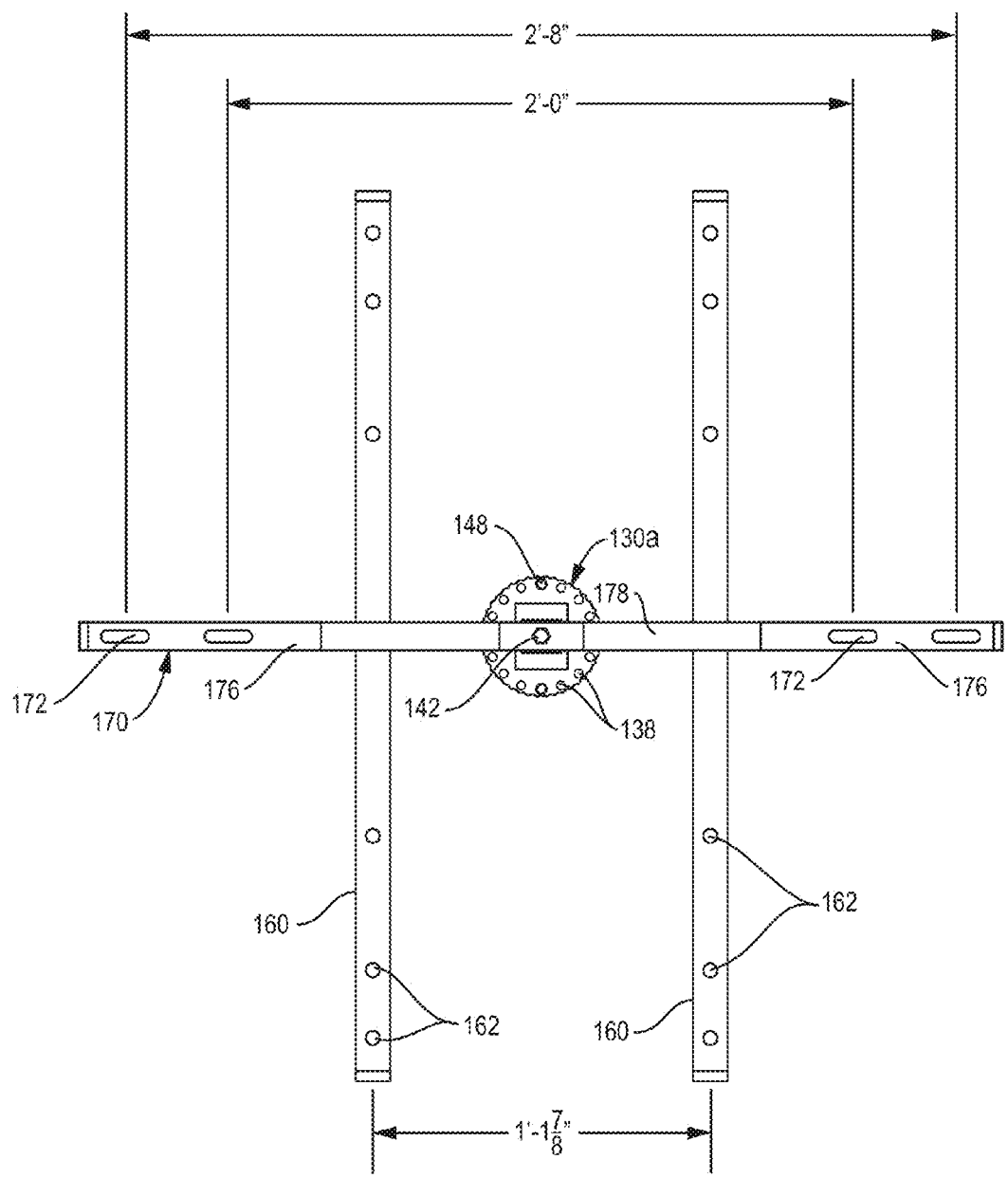
FIG. 23 is a top view of the embodiment appearing in FIG. 21 in the non-pivoted position, showing the swivel bar carrying the unit connector arms in the fully retracted position.
Figure 24:
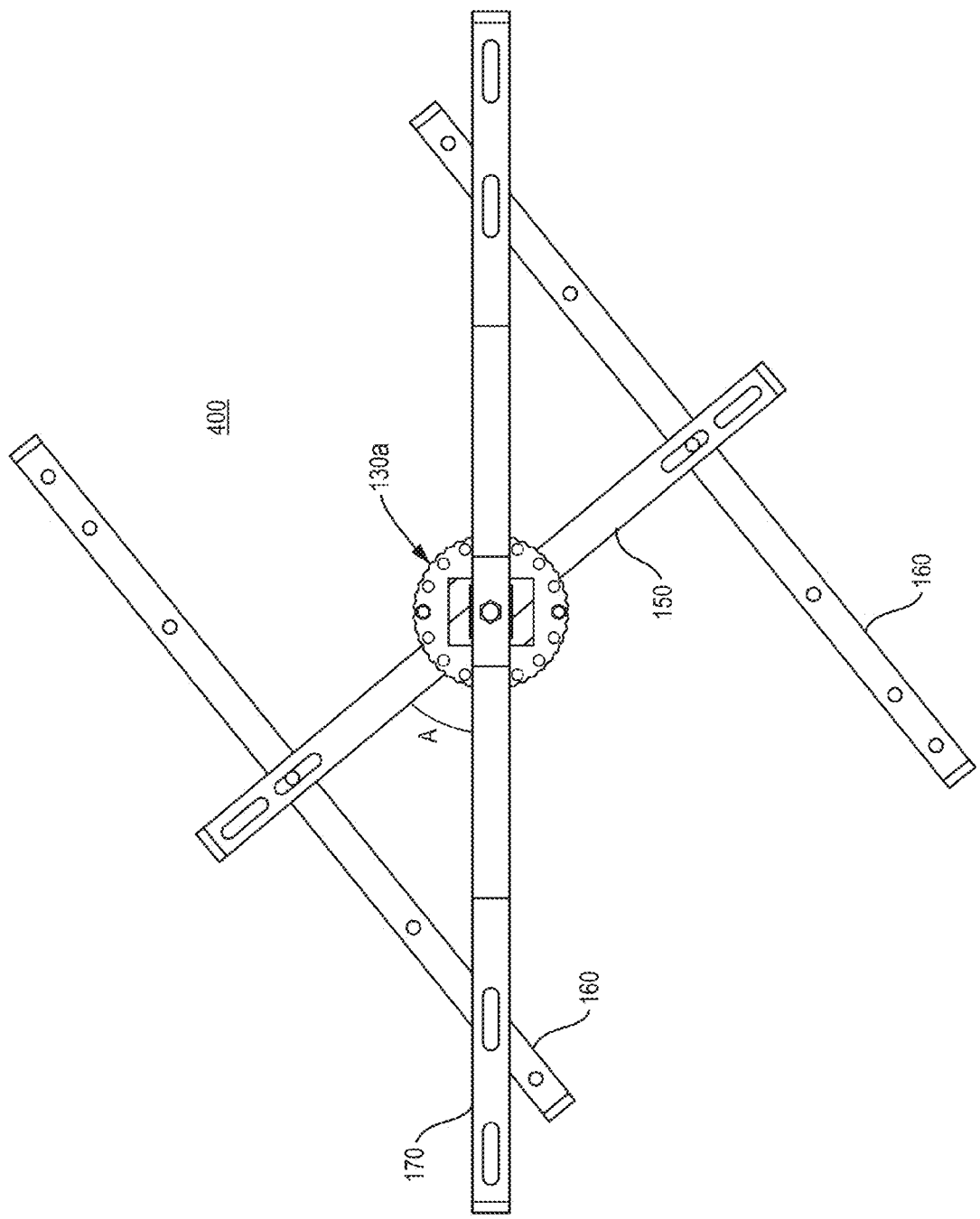
FIG. 24 is a top view of the embodiment appearing in FIG. 21 in a pivoted position, with the swivel bar carrying the unit connector arms in the fully retracted position.
Figure 25:
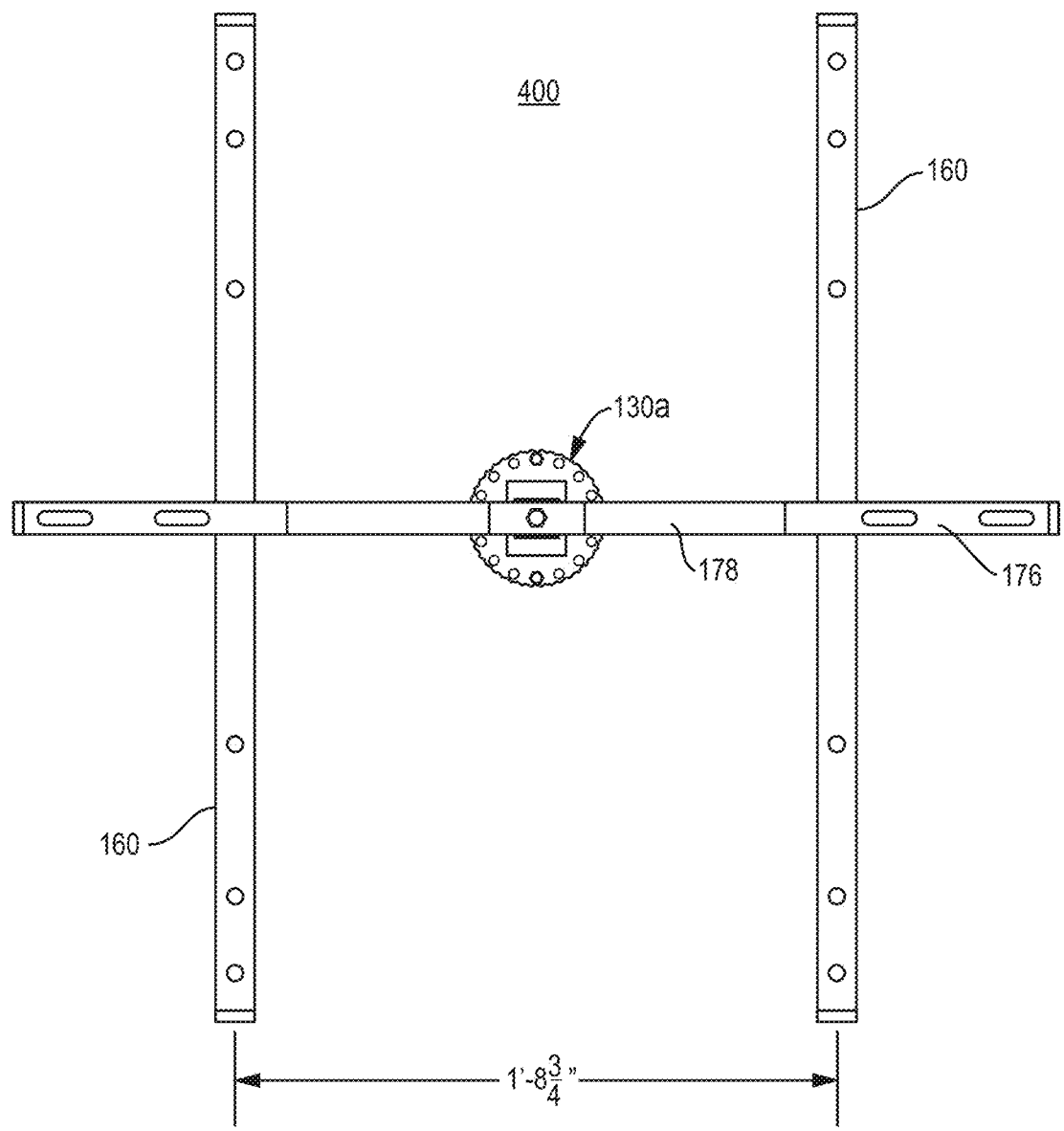
FIG. 25 is a top view of the embodiment appearing in FIG. 21 in the non-pivoted position, with the swivel bar carrying the unit connector arms in the fully extended position.
Figure 26:
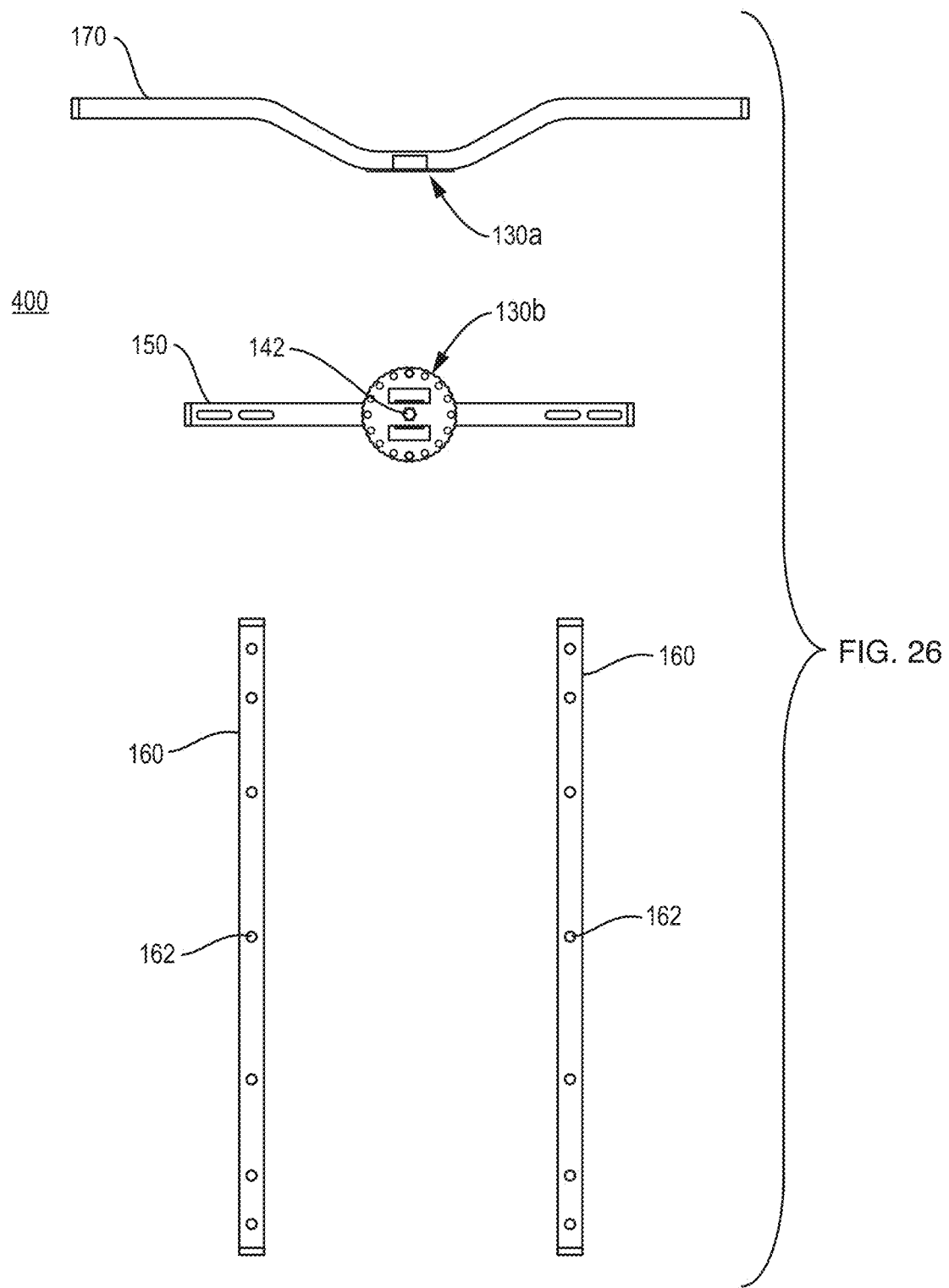
FIG. 26 is an assembly view of the embodiment appearing in FIG. 21, wherein the flush mount bar is shown in elevation view, and wherein the swivel bar with the lower locking disk and the unit connector bars are shown in top plan view.
Figure 27:
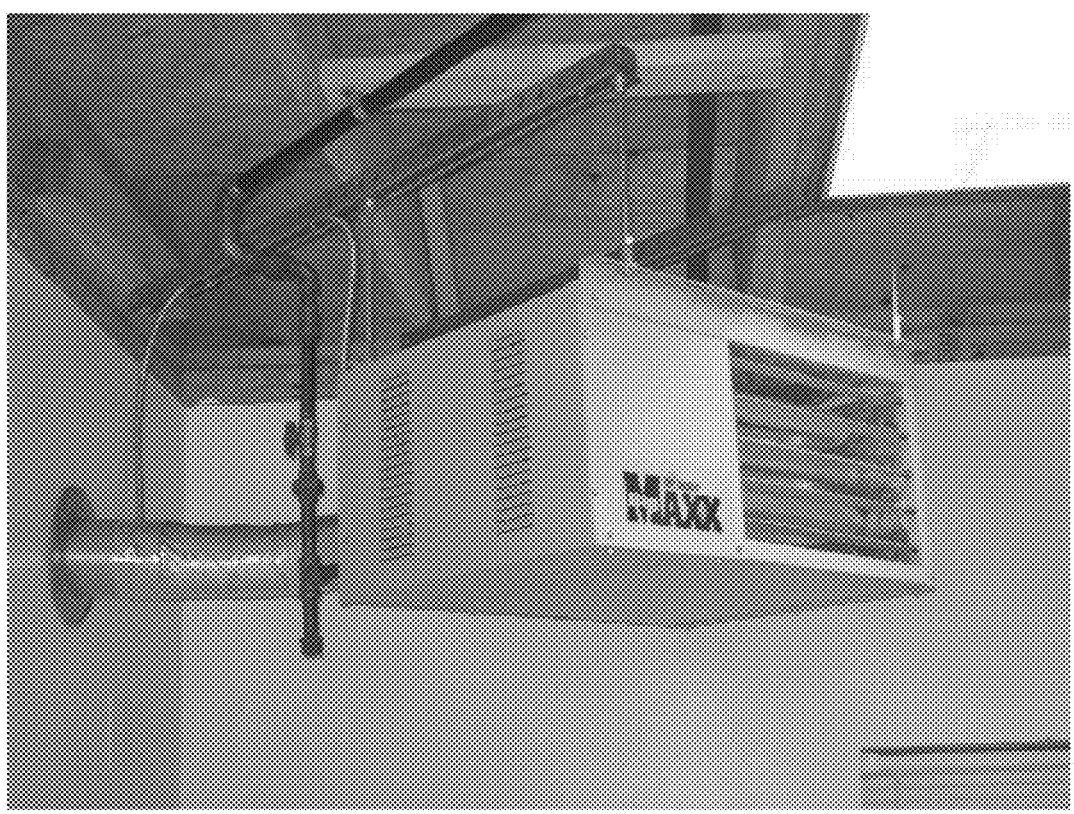
FIG. 27 depicts the prior art method employing strut channels and threaded rods.

Similarly, in the depiction of FIG. 12, the H-bars 160 are secured when the fasteners 154 pass through the inner ends of the innermost elongate openings 152 in the swivel bar 150, thus illustrating the H-bar assembly in the fully refracted position. The exemplary dimensions for the fully retracted and expanded positions appear in FIGS. 23 (13 ⅞ inches) and 25 (20 ¾ inches), respectively, discussed below and are equally applicable here, although other dimensions are contemplated. Intermediate positions may be obtained by loosening the fasteners 154 and positioning the H-bars 160 at intermediate positions within the elongate openings 152, thereby accommodating HVAC units or other items of various sizes.

The plurality of openings 162 are spaced along the length of the H-bars 160 and may be used to secure the HVAC unit or other item at four points, e.g., via mechanical fasteners passing through selected ones of the openings 162 and respectively aligned mounting hardware or brackets on the HVAC unit or other device to be mounted. The spacing of the openings 162 may be selected in accordance with common or conventional sizes of HVAC units to be supported and/or mounting hardware therefore.

Referring now to FIGS. 15-20, there appears a third locking swivel embodiment 300 including the locking swivel assembly 130a, 130b and swivel bar 150 as detailed above, but wherein the telescoping U-bar assembly is replaced with a low profile mounting bar 170, which is advantageous for suspending the HVAC unit or other item in a finished space, e.g., where a drywall or other finish layer 182 does not allow direct access to the overhead ceiling joists 180. Unless stated otherwise, reference numerals appearing in FIGS. 15-20 are as described above by way of reference to FIGS. 1-14, which discussion above is equally applicable and incorporated here by reference.

The low profile bar 170 includes left and right mounting arms 176 for attachment to an overhead surface and an offset central portion 178 containing a central opening 177. The bar 170 may be formed out of a tubular metal (e.g., steel) stock material and may be bent to provide any desired profile, preferably 5-6 inches although any desired height between the arms 176 and the central portion 178 is contemplated.

Figure 15:
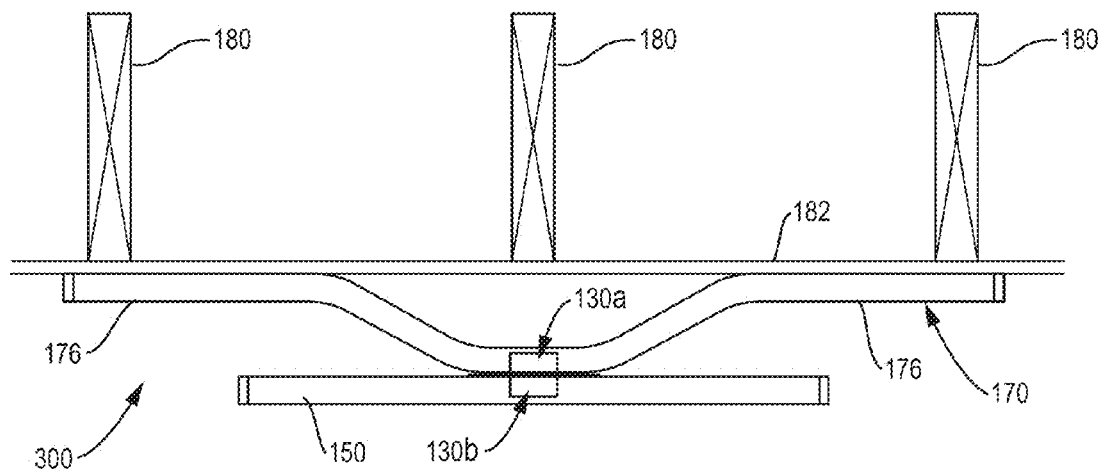
FIG. 15 is a front elevational view of a third embodiment of the locking swivel hanger herein, illustrating the flush mount bar oriented perpendicular to the direction of the joists.
Figure 16:
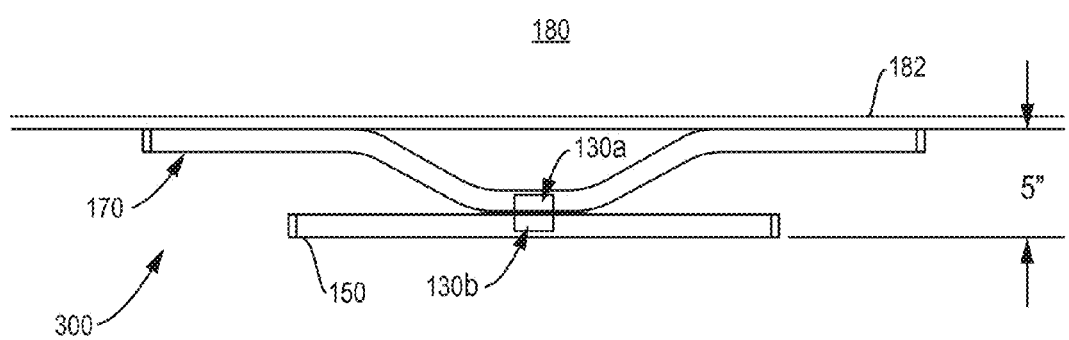
FIG. 16 is a front elevational view of the embodiment appearing in FIG. 15, illustrating the flush mount bar oriented parallel to the direction of the joists.
Figure 17:
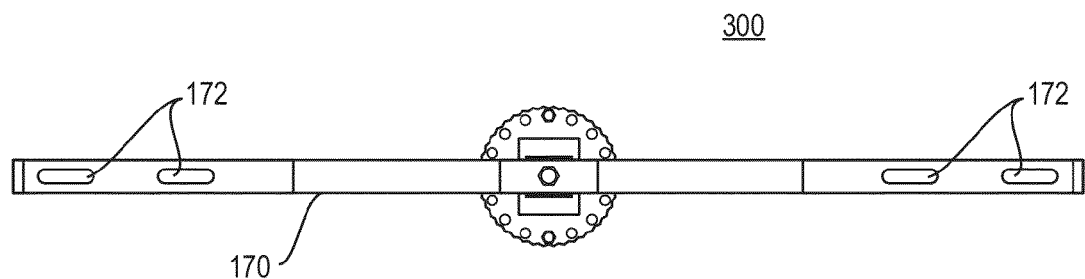
FIG. 17 is a top view of the embodiment appearing in FIG. 15, in the non-pivoted position.

The low profile bar 170 may be secured via fasteners passing through one or more of the openings in each of the arms 176 and into a joist, beam, or the like 180. As shown in FIG. 15, the bar 170 may be oriented perpendicular to the joists 180 and the openings 172 may be spaced along the lengths of the arms 176 so as to accommodate standard or conventional joist spacings. In a preferred embodiment, the inner set of openings 172 may be spaced apart approximately 24 inches on center and the outer set of openings 172 may be spaced apart approximately 32 inches on center. In addition, the openings 172 are preferably elongated to accommodate a variety of joist spacings and increase adjustability and/or to accommodate variations or tolerances in the joist spacing for applications in which the bar 170 is mounted perpendicular to the joists as shown in FIG. 15. Exemplary dimensions for spacing of the openings 172 appear in FIG. 23 and are equally applicable here, although other dimensions are contemplated. As shown in FIG. 16, the low profile bar 170 may also be secured in an orientation parallel to the joists 180 along a single joist.

Figure 18:
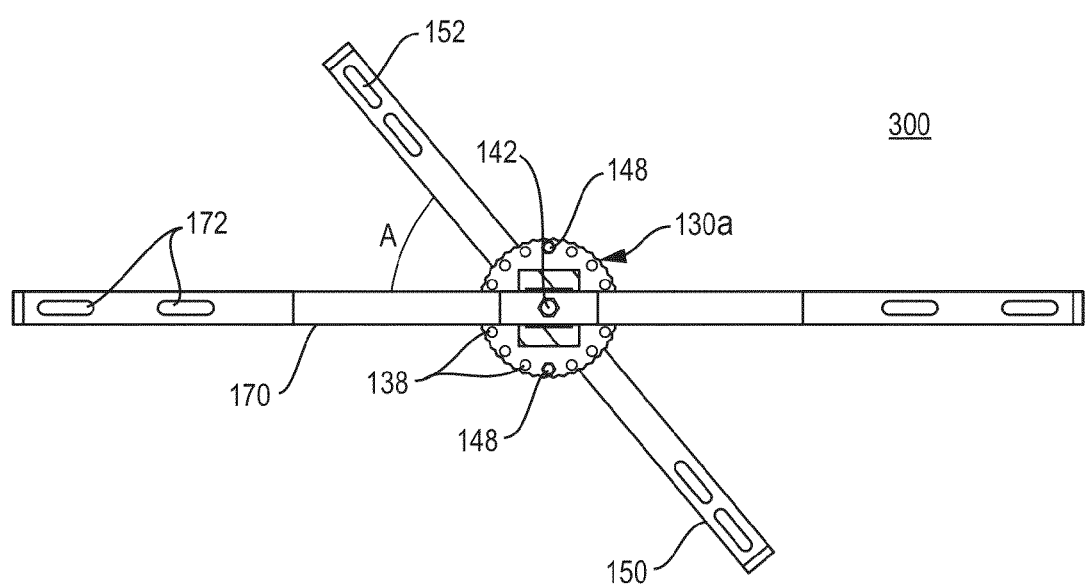
FIG. 18 is a top view of the embodiment appearing in FIG. 15, in a pivoted position.
Figure 19:
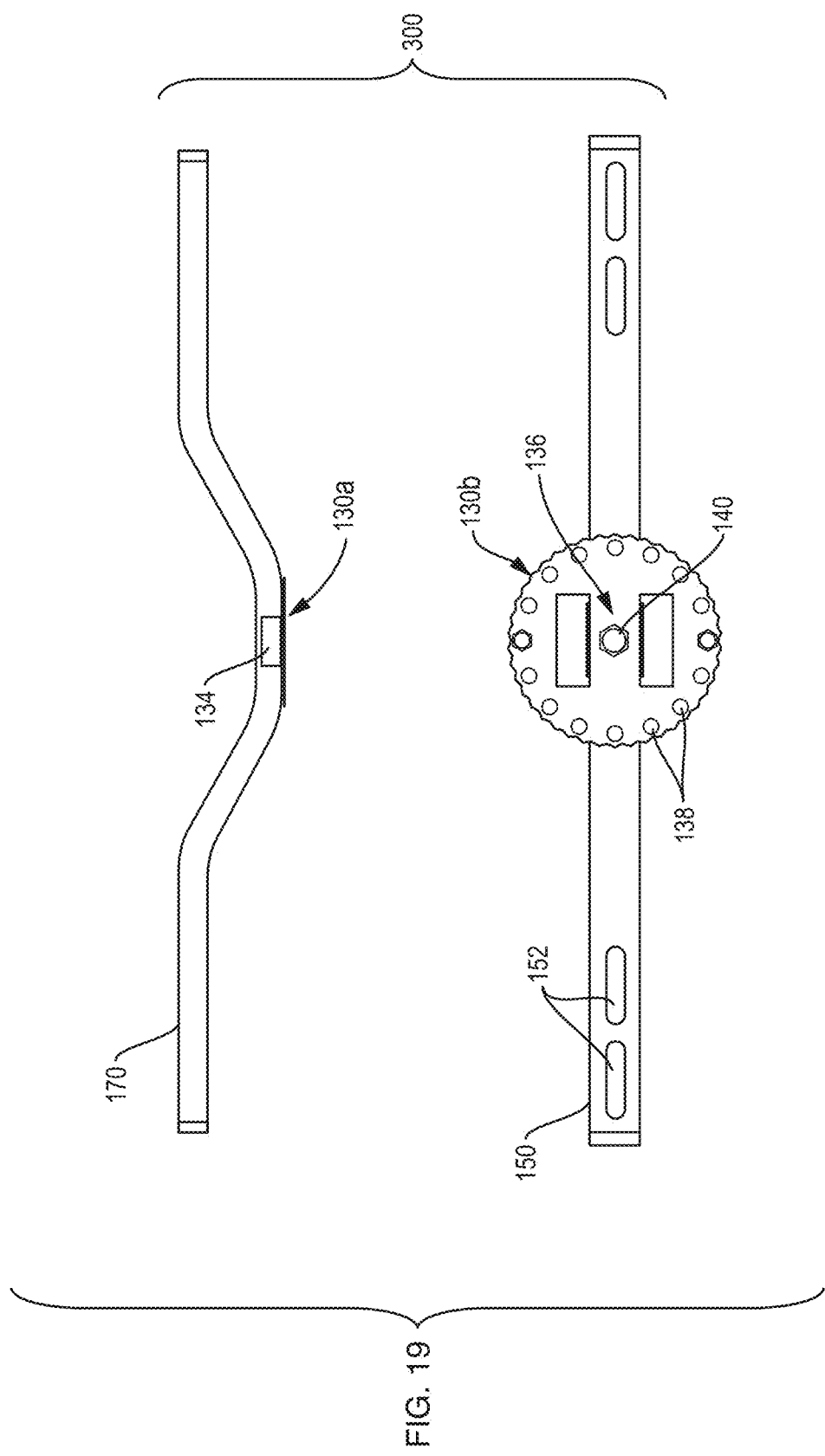
FIG. 19 is an assembly view of the embodiment appearing in FIG. 15, wherein the flush mount bar is shown in elevation view and wherein the swivel bar with the lower locking disk are shown in top plan view.
Figure 20:
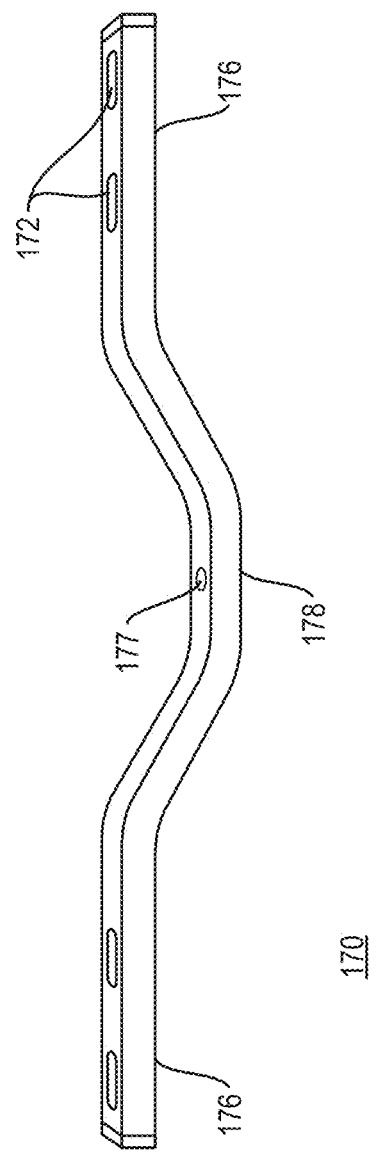
FIG. 20 is a photographic image of an exemplary flush mount bar herein.
Figure 21:
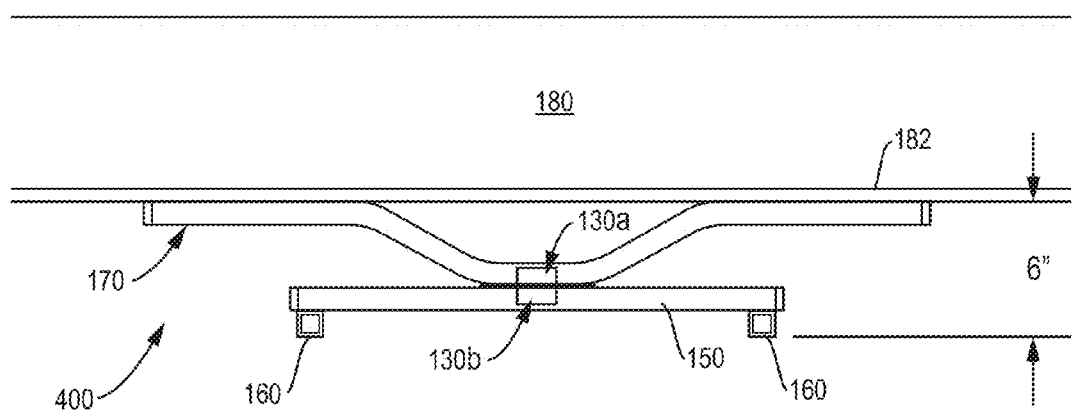
FIG. 21 is a front elevational view of a fourth embodiment of the locking swivel hanger herein, illustrating the flush mount bar oriented parallel to the direction of the joists.
Figure 22:
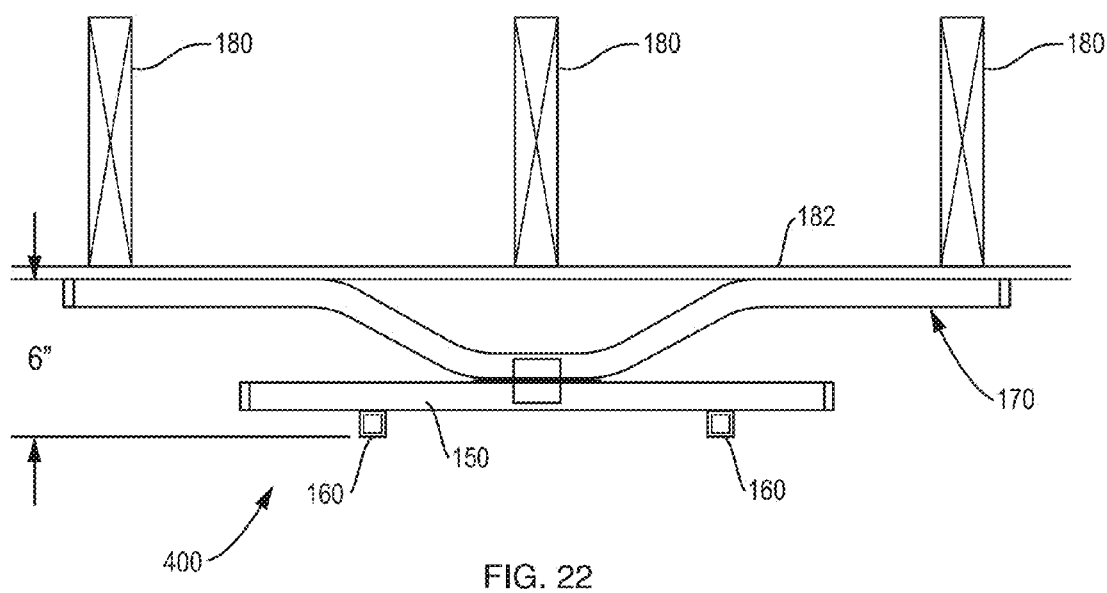
FIG. 22 is a front elevational view of the embodiment appearing in FIG. 21, illustrating the flush mount bar oriented perpendicular to the direction of the joists.

The central portion 178 of the low profile bar 170 is received in the channel 136 of the disc 130a. The channel 136 of the lower disc 130b receives the swivel bar 150. A fastener 142 passes through the central opening 177 in the center section 178 of the bar 170, through the central openings 140 in each of the discs 130a and 130b, and through the central opening in the swivel bar 150 to pivotally secure the bar 170 to the swivel bar 150. As shown in FIG. 18, the swivel arm 150 may be pivoted relative to the low profile bar 170 to a desired angle A.

Referring now to FIGS. 22-26, there is shown a fourth exemplary locking swivel mount embodiment 400, which is as described above by way of reference to FIGS. 15-20, except where the swivel bar 150 appears with the left and right H-bars 160 as described above by way of reference to FIGS. 9-14. Unless stated otherwise, reference numerals appearing in FIGS. 22-26 are as described above by way of reference to FIGS. 1-21, which discussion above is equally applicable and incorporated here by reference. Again, the H-bar assembly can be rotated to any desired angle A (see FIG. 24) and locked in position via fasteners 148 as detailed above. Likewise, the width of H-bar assembly can be adjusted between the fully expanded width appearing in FIG. 25 and the fully retracted width appearing in FIG. 23, as described above.

The invention has been described with reference to the preferred embodiments. Modifications and alterations will occur to others upon a reading and understanding of the preceding detailed description. It is intended that the invention be construed as including all such modifications and alterations insofar as they come within the scope of the amended claims.

The invention claimed is:

1. An apparatus, comprising:
an upper hanging member having at least one arm adapted to be attached at an upper end to an overhead structure and a horizontal portion attached to the at least one arm;
a lower hanging member adapted to attach to an object to be suspended from the overhead structure;
an upper locking disk comprising a first planar body and a first pair of opposing walls projecting upward from the first planar body and defining a first channel, the horizontal portion of the upper hanging member received within the first channel;
a lower locking disk comprising a second planar body and a second pair of opposing walls projecting downward from the second planar body and defining a second channel, the lower hanging member received within the second channel;

a fastener extending through aligned bores in the horizontal portion of the upper hanging member, the first channel, the second channel, and the lower hanging member to provide a pivoting connection between the upper hanging member and the lower hanging member;

a first plurality of spaced apart apertures formed in the first planar body and arranged in a full or partial circular array;

a second plurality of spaced apart apertures formed in the second planar body and arranged in a full or partial circular array; and one or more fasteners removably received in a selected one of the first plurality of spaced apart apertures and a selected, aligned one of the second plurality of spaced apart apertures for affixing the lower hanging member in a desired angular orientation relative to the upper hanging member.

2. The apparatus of claim 1, wherein the lower hanging member is adapted to attach to an HVAC unit.

3. The apparatus of claim 1, wherein the fastener is a selected from a pivot bolt and a pivot pin.

4. The apparatus of claim 1, further comprising:
the at least one arm including a generally vertical hollow member and a bar telescopically received within the hollow member; and
clearance openings located in the hollow member and in the bar for receiving one or more fasteners for attaching the hollow member to the bar at a desired telescopic position to selectively raise or lower the height of the object to be suspended.

5. The apparatus of claim 1, wherein said at least one arm comprises first and second arms, each of the first and second arms connected at a first end to the horizontal portion and having a second end opposite the first end adapted for connection to the overhead structure.

6. The apparatus of claim 5, wherein said upper hanging member is generally U-shaped, wherein each of the first and second arms include:
a generally vertical hollow member and a bar telescopically received within the hollow member; and
clearance openings located in the hollow member and in the bar for receiving one or more fasteners for attaching the hollow member to the bar at a desired telescopic position to selectively raise or lower the height of the object to be suspended.

7. The apparatus of claim 1, wherein the lower hanging member is a generally horizontal bar adapted to be attached to an HVAC unit.

8. The apparatus of claim 1, wherein the lower hanging member includes:
a transverse bar received within the second channel;
a pair of parallel horizontal arms extending at generally right angles to the transverse bar and disposed on opposite sides of the second channel.

9. The apparatus of claim 8, wherein the transverse bar is configured to attach the pair of horizontal arms at a plurality of distances from the second channel.

10. The apparatus of claim 8, wherein the plurality of distances are selected to accommodate attachment of HVAC units of different widths.

11. The apparatus of claim 1, wherein said upper hanging member comprises first and second horizontal arms and a concave portion including the horizontal portion, the concave portion spanning the first and second horizontal arms, wherein the horizontal portion is vertically offset from the first and second horizontal arms.

12. The apparatus of claim 11, wherein the first and second horizontal arms are adapted to attach to an overhead structure in a finished interior space.

13. The apparatus of claims 11, wherein the vertical offset between the horizontal portion and the first and second horizontal arms is relatively small when compared to the overall length of the upper hanging member.

14. A kit having component parts capable of being arranged in a disassembled or partially disassembled form and of being assembled into a hanging swivel support apparatus, said kit comprising:
an upper hanging member having at least one arm adapted to be attached at an upper end to an overhead structure and a horizontal portion attached to the at least one arm;
a lower hanging member adapted to attach to an object to be suspended from the overhead structure;
an upper locking disk comprising a first planar body and a first pair of opposing walls projecting upward from the first planar body and defining a first channel, the horizontal portion of the upper hanging member being sized to be received within the first channel;
a lower locking disk comprising a second planar body and a second pair of opposing walls projecting downward from the second planar body and defining a second channel, the lower hanging member being sized to be received within the second channel;
a fastener configured to extend through aligned bores in the horizontal portion of the upper hanging member, the first channel, the second channel, and the lower hanging member to provide a pivoting connection between the upper hanging member and the lower hanging member when the hanging swivel support apparatus is assembled;
a first plurality of spaced apart apertures formed in the first planar body and arranged in a full or partial circular array;
a second plurality of spaced apart apertures formed in the second planar body and arranged in a full or partial circular array; and
one or more fasteners adapted to be removably received in a selected one of the first plurality of spaced apart apertures and a selected, aligned one of the second plurality of spaced apart apertures for affixing the lower hanging member in a desired angular orientation relative to the upper hanging member when the hanging swivel support apparatus is assembled.

15. The kit of claim 14, further comprising:
the at least one arm including a generally vertical hollow member and a bar adapted to be telescopically received within the hollow member; and
clearance openings located in the hollow member and in the bar for receiving one or more fasteners for attaching the hollow member to the bar at a desired telescopic position to selectively raise or lower the height of the object to be suspended.

16. The kit of claim 14, wherein said at least one arm comprises first and second arms, each of the first and second arms connected at a first end to the horizontal portion and having a second end opposite the first end adapted for connection to the overhead structure.

17. The kit of claim 16, wherein said upper hanging member is generally U-shaped, wherein each of the first and second arms include:
a generally vertical hollow member and a bar adapted to be telescopically received within the hollow member; and
clearance openings located in the hollow member and in the bar for receiving one or more fasteners for attaching the hollow member to the bar at a desired telescopic position to selectively raise or lower the height of the object to be suspended.

18. The kit of claim 14, wherein the lower hanging member is a generally horizontal bar adapted to be attached to an HVAC unit.

19. The kit of claim 14, wherein the lower hanging member includes:
- a transverse bar received within the second channel;
- a pair of parallel horizontal arms configured to extend at generally right angles to the transverse bar on opposite sides of the second channel.

20. The kit of claim 14, wherein said upper hanging member comprises first and second horizontal arms and a concave portion including the horizontal portion, the concave portion spanning the first and second horizontal arms, wherein the horizontal portion is vertically offset from the first and second horizontal arms.

* * * * *